(12) United States Patent
Winn (10) Patent No.: US 10,503,721 B2
(45) Date of Patent: *Dec. 10, 2019

(54) CONFLICT RESOLUTION FOR A MULTI-USER CAX ENVIRONMENT

(71) Applicant: United Technologies Corporation, Farmingon, CT (US)

(72) Inventor: Joshua Daniel Winn, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,221

(22) Filed: Apr. 25, 2018

(65) Prior Publication Data

US 2018/0239795 A1 Aug. 23, 2018

Related U.S. Application Data

(63) Continuation of application No. 14/609,810, filed on Jan. 30, 2015, now Pat. No. 10,002,150.

(60) Provisional application No. 61/938,193, filed on Feb. 11, 2014.

(51) Int. Cl.
*G06F 16/00* (2019.01)
*G06F 16/23* (2019.01)
*G06Q 10/10* (2012.01)

(52) U.S. Cl.
CPC ....... *G06F 16/2343* (2019.01); *G06Q 10/101* (2013.01)

(58) Field of Classification Search
CPC .................. G06F 17/30362; G06F 16/2343
USPC .......................................................... 707/704
See application file for complete search history.

(56) References Cited

U.S. PATENT DOCUMENTS

| | | | |
|---|---|---|---|
| 6,341,291 B1 * | 1/2002 | Bentley | ................. G06F 16/168 |
| 7,466,313 B2 | 12/2008 | Kehrle et al. | |
| 7,663,625 B2 | 2/2010 | Chartier et al. | |
| 8,214,423 B2 | 7/2012 | Freitag | |
| 8,229,715 B1 | 7/2012 | Teller et al. | |
| 8,499,036 B2 | 7/2013 | Kalthoff et al. | |
| 8,566,066 B2 | 10/2013 | Thompson et al. | |
| 8,892,404 B2 | 11/2014 | Potter et al. | |
| 9,122,817 B2 | 9/2015 | Red et al. | |
| 9,292,261 B1 | 3/2016 | Bouldin et al. | |
| 9,648,059 B2 | 5/2017 | Nysetvold et al. | |

(Continued)

OTHER PUBLICATIONS

Xu, Yue, A Flexible Context Architecture for a Multi-User GUI, Thesis, Dec. 2010, Department of Mechanical Engineering, Brigham Young University.

(Continued)

*Primary Examiner* — Chelcie L Daye (74) *Attorney, Agent, or Firm* — Carlson, Gaskey & Olds, P.C.

(57) ABSTRACT

A system for conflict resolution in a multi-user design package includes a host computer having a memory and a processor, wherein the host computer is configured to operate a multi-user CAx environment, and is configured to receive edit commands from a plurality of local computers. A conflict resolution module is configured to be executed by the host computer, and the conflict resolution module is configured to prevent implementation of conflicting edit commands received from the plurality of local computers in the multi-user CAx environment.

6 Claims, 5 Drawing Sheets

(56) References Cited

U.S. PATENT DOCUMENTS

| | | | |
|---|---|---|---|
| 2010/0211545 A1* | 8/2010 | Soni | G06F 16/27 |
| | | | 707/623 |
| 2012/0284176 A1* | 11/2012 | Svendsen | H04N 5/76 |
| | | | 705/39 |
| 2013/0144566 A1 | 6/2013 | De Biswas | |
| 2014/0149882 A1 | 5/2014 | Nysetvold et al. | |
| 2014/0222387 A1 | 8/2014 | Cannon et al. | |
| 2014/0222919 A1* | 8/2014 | Nysetvold | H04L 65/403 |
| | | | 709/204 |
| 2014/0236550 A1 | 8/2014 | Nysetvold et al. | |
| 2015/0120252 A1 | 4/2015 | Hepworth et al. | |
| 2015/0373068 A1 | 12/2015 | Allen et al. | |
| 2016/0021183 A1 | 1/2016 | Bowman et al. | |
| 2016/0098494 A1 | 4/2016 | Webster et al. | |
| 2016/0155161 A1 | 6/2016 | Reisman | |

OTHER PUBLICATIONS

Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.
Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.

* cited by examiner

CONFLICT RESOLUTION FOR A MULTI-USER CAX ENVIRONMENT

CROSS-REFERENCE TO RELATED APPLICATION

This application claims priority to U.S. patent application Ser. No. 14/609,810 filed on Jan. 30, 2015. U.S. patent application Ser. No. 14/609,810 claims priority to U.S. Provisional Application No. 61/938,193 filed on Feb. 11, 2014.

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment a system for conflict resolution in a multi-user design includes a host computer including a memory and a processor, wherein the host computer is configured to operate a multi-user CAx environment, and configured to receive edit commands from a plurality of local computers, each of the local computers operating a local CAx environment within the multi-user CAx environment, and a conflict resolution module configured to execute on the host computer, wherein the conflict resolution module is configured to prevent implementation of conflicting edit commands received from the plurality of local computers in the multi-user CAx environment, and wherein the conflict resolution module is configured to cause the multi-user CAx environment to create a temporary file at the host computer in response to receiving at least one edit command from at least one of the local computers.

In another example of the above described system for conflict resolution in a multi-user design the conflict resolution module is a lock based conflict resolution module.

In another example of any of the above described systems for conflict resolution in a multi-user design the lock based conflict resolution module is a software based conflict resolution module configured to cause the multi-user CAx environment to allow a first local computer to edit an aspect of a part file and configured to prevent each other local computer from editing the aspect of the part file for a duration of the first local computers edits.

In another example of any of the above described systems for conflict resolution in a multi-user design the conflict resolution module is configured to store edits to the aspect of the part file originating from each other local computer in the temporary file for the duration of the first local computer's edits.

In another example of any of the above described systems for conflict resolution in a multi-user design the conflict resolution module is further configured to cause the multi-user CAx environment to analyze the edits stored in the temporary edit file, to remove redundant and conflicting edits in the temporary file and to implement edits stored in the temporary file after the duration of the first local computer's edits.

In another example of any of the above described systems for conflict resolution in a multi-user design the conflict resolution module is a first in first out conflict resolution module.

In another example of any of the above described systems for conflict resolution in a multi-user design the conflict resolution module is a combination of a lock based conflict resolution module and a first in first out conflict resolution module.

In another example of any of the above described systems for conflict resolution in a multi-user design the conflict resolution module is a software component within the multi-user CAx environment.

In another example of any of the above described systems for conflict resolution in a multi-user design the conflict resolution module is a computer component distinct from the host computer and wherein the computer component connects each of the local computers to the host computer.

In another example of any of the above described systems for conflict resolution in a multi-user design the edit commands are non-geometric inputs.

Another example of any of the above described systems for conflict resolution in a multi-user design further includes a data storage component connected to the host computer wherein the data storage component includes a database storing a finished copy of a part file.

An exemplary method for resolving conflicting edits in a multi-user CAx environment includes receiving edits originating from a plurality of local computers at a host computer operating a multi-user CAx environment, wherein each of the local computers is operating a local CAx environment within the multi-user CAx environment, preventing implementation of conflicting edits using a conflict resolution module in the multi-user CAx environment by at least one of a lock out conflict resolution procedure and a first in first out conflict resolution procedure, and implementing non-conflicting edits to a part file using the multi-user CAx environment.

In another example of the above described exemplary method for resolving conflicting edits in a multi-user CAx environment the conflict resolution module uses the first in first out conflict resolution procedure, and wherein the first in first out conflict resolution procedure creates a temporary file in response to receiving the edits, storing the results of the edits in the temporary file, and allowing one or more users to perform one of an approve action or a modify action based on the results of the edits.

In another example of any of the above described exemplary methods for resolving conflicting edits in a multi-user CAx environment the conflict resolution module further creates a temporary edit file and stores edits to the aspect of the part file originating from each other local computer in the temporary edit file for the duration of the first local computer's edits.

In another example of any of the above described exemplary methods for resolving conflicting edits in a multi-user CAx environment the conflict resolution module analyzes the edits stored in the temporary edit file, removes redundant and conflicting edits in the temporary edit file and implements non-conflicting edits stored in the temporary edit file after the duration of the first local computer's edits.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
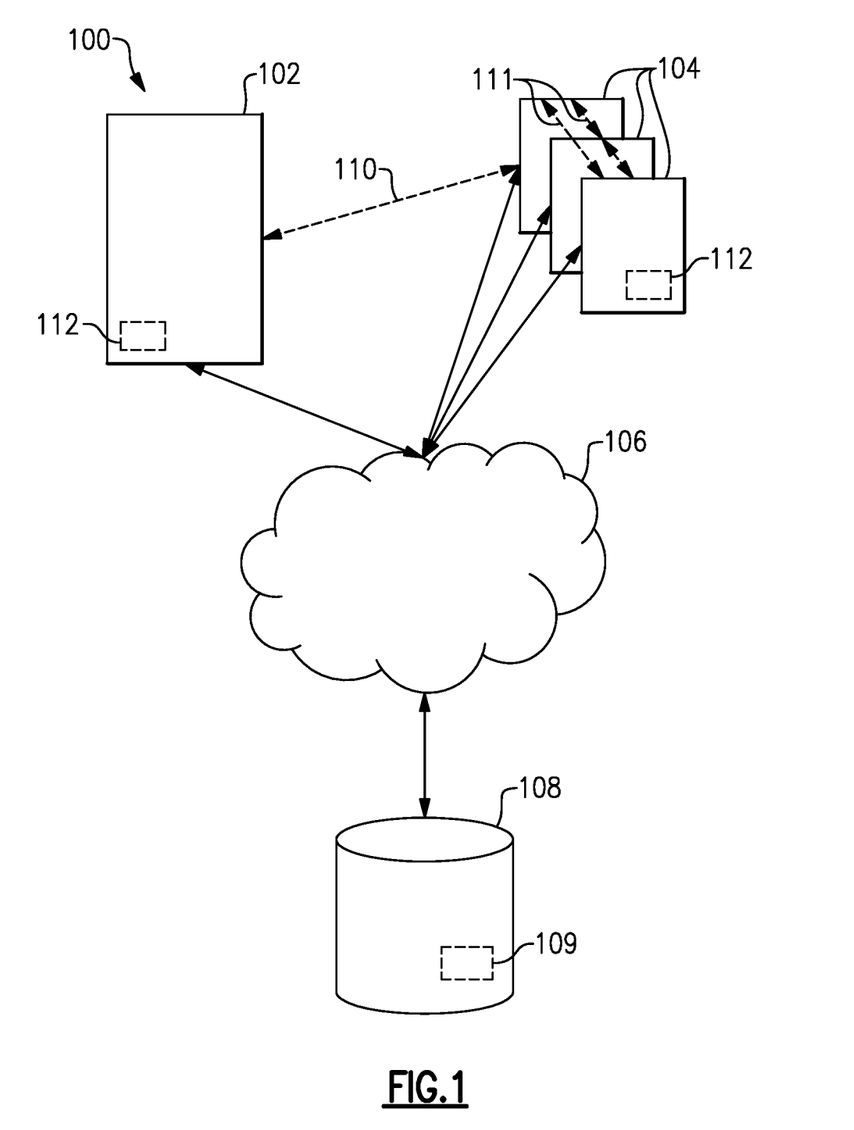
FIG. 1 illustrates a system for a multi-user CAx environment, according to an embodiment.

FIG. 1 illustrates an embodiment computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, a relative or absolute spatial position or orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one custom layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to make modifications to various aspects of a component design corresponding to one or more part files. In some embodiments, the part file is stored locally at the storage system 108, with local copies of the part file at the client computers 104 being synchronized periodically. Modifications to each part file are communicated to each CAx environment currently accessing the part file, either in real-time or periodically utilizing a synchronization scheme. Display or visualization of the modification is therefore made substantially immediately available in CAx environments accessing the same part file, which can assist the multiple users in identifying conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for example. Accordingly, it may be desirable to limit the visualization of a particular aspect of a component design depending on the level(s) of access provided to a particular user profile. Each user profile corresponds to one or more access lists setting the level(s) of access for each user profile.

Figure 2A:
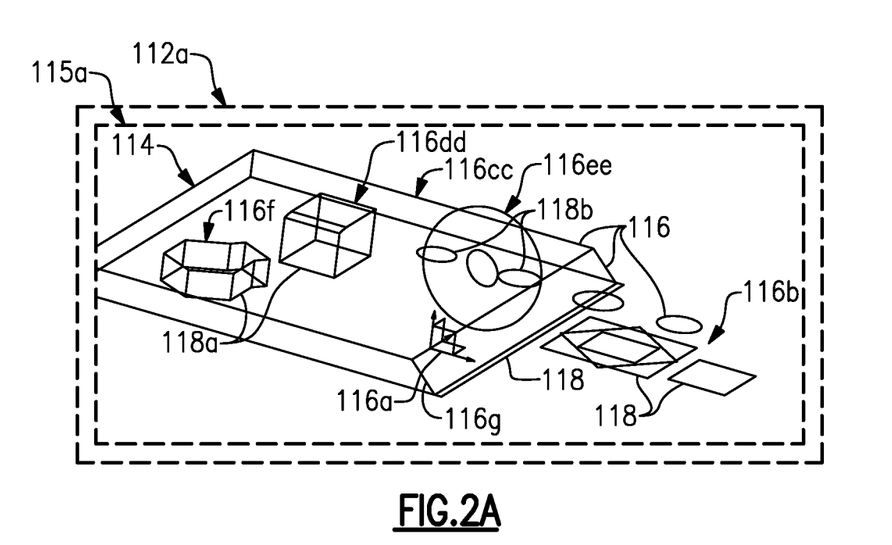
FIG. 2A illustrates a sample component design displayed in a first CAx environment, according to an embodiment.
Figure 2B:
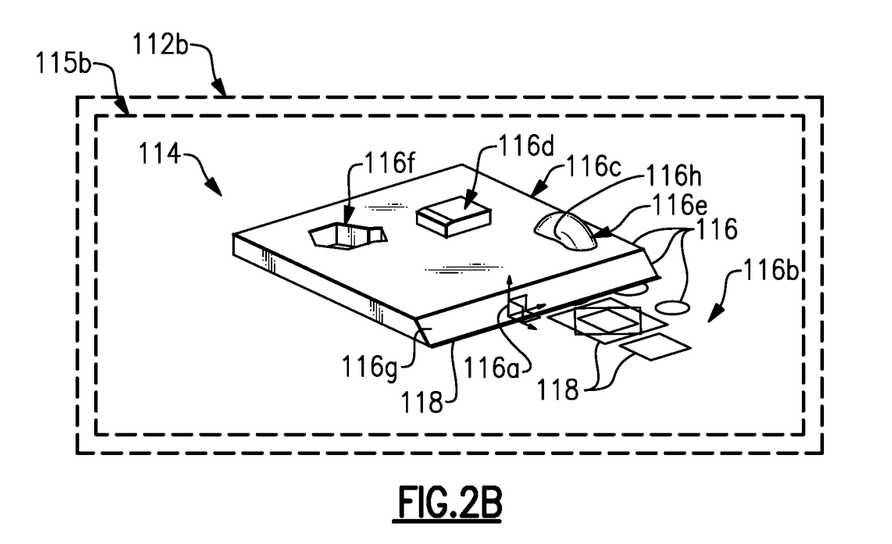
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

Multi-user CAx systems, such the multi-user CAx system 100 described above, and illustrated in FIG. 1, utilize at least two types of user inputs during a design session. A first type of user input is a geometry input that modifies the physical geometry of a part file being operated on in the multi-user CAx environment 112. By way of example, a geometry input alters the thickness, orientation, or any other dimension of a particular component. A second type of user input is a non-geometry input. Non-geometry inputs include inputs that modify aspects of the part file, but do not include a direct geometric alteration. Non-geometric inputs can include, but are not limited to, undo commands, redo commands, attribute edits, layers, reference sets, coordinate systems, groups, expressions, etc.

One user inputting, altering, or otherwise changing non-geometric aspects of a part file in the multi-user CAx environment 112 during a multi-user design session can result in conflicts with edits performed by other users during the multi-user design session. By way of example, in the system 100, as shown in FIG. 1, when a first user wishes to undo their latest edit, an "undo" command is sent to the host computer 102, from the user's local computer 104. Without any conflict check and/or resolution element in the host computer 102, the host computer 102 responds to the undo command by undoing the most recent non-geometry command that has been received at the host computer 102, regardless of which local computer 104 the command originated from. As such, a user intending to undo their most recent action may inadvertently undo another user's most recent action instead.

Figure 3:
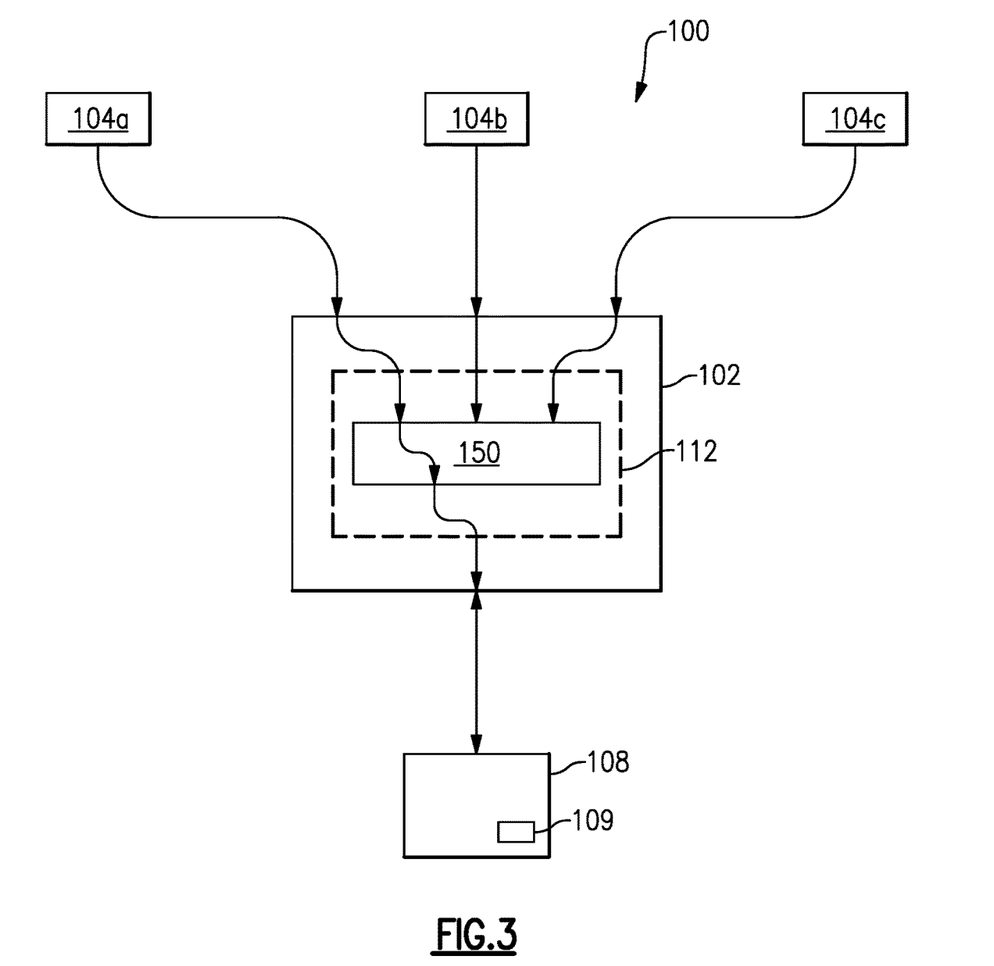
FIG. 3 illustrates a first embodiment of a system, according to the system of FIG. 1.

With continued reference to FIG. 1, FIG. 3 illustrates an alternate schematic representation of the multi-user CAx system 100 of FIG. 1 with the addition of a lock based conflict resolution module 150 in the multi-user CAx environment 112 on the host computer 102. In the illustrated example, the lock based conflict resolution module 150 is contained within the multi-user CAx environment 112. In alternative embodiments, the lock based conflict resolution module 150 is a distinct program from the CAx environment 112 and is interfaced with the multi-user CAx environment 112.

In the illustrated embodiment of FIG. 3, when a user at a first local computer 104a begins to edit a particular non-geometric aspect of the part file within the multi-user CAx environment 112, such as a reference set, coordinate system, or layer, the lock based conflict resolution module 150 on the host computer 102 prevents each other local computer 104b, 104c from accessing, or otherwise altering the part file in the multi-user CAx environment 112. This is referred to as locking out the other local computers 104b, 104c. Any attempted edits to the non-geometric aspect that the user at the first local computer 104a is editing, originating from the other users at the other local computers 104b, 104c, are blocked by the lock based conflict resolution module 150 and are not implemented.

In some embodiments, the lock based conflict resolution module 150 can create a temporary file, storing edits originating from one of the other local computers 104b, 104c and pass any edits that do not conflict with the edits originating from the first local computer 104a to the database 109 in the data storage element 108 when the edits originating from the first user at the first local computer 104a are completed. In such an embodiment, the lock based conflict resolution module 150 analyzes the changes in the temporary file and removes any redundant or contradictory edits, and applies the remaining edits.

In some embodiments, the lock based conflict resolution module 150 further presents an error message to the other local computers 104b, 104c in response to attempted edits originating from the other local computers 104b, 104c. The error message informs the users attempting to edit the non-geometric aspect of the part file that the aspect is currently being edited by another user. In some embodiments, the error message further indicates that the other local computers 14b, 104c are locked out from making edits to that aspect until after the first user at the first local computer 104a has completed their edits. In some embodiments, the error message identifies which user, or which local computer 104a, 104b, 104c, is making the edits.

Figure 4:
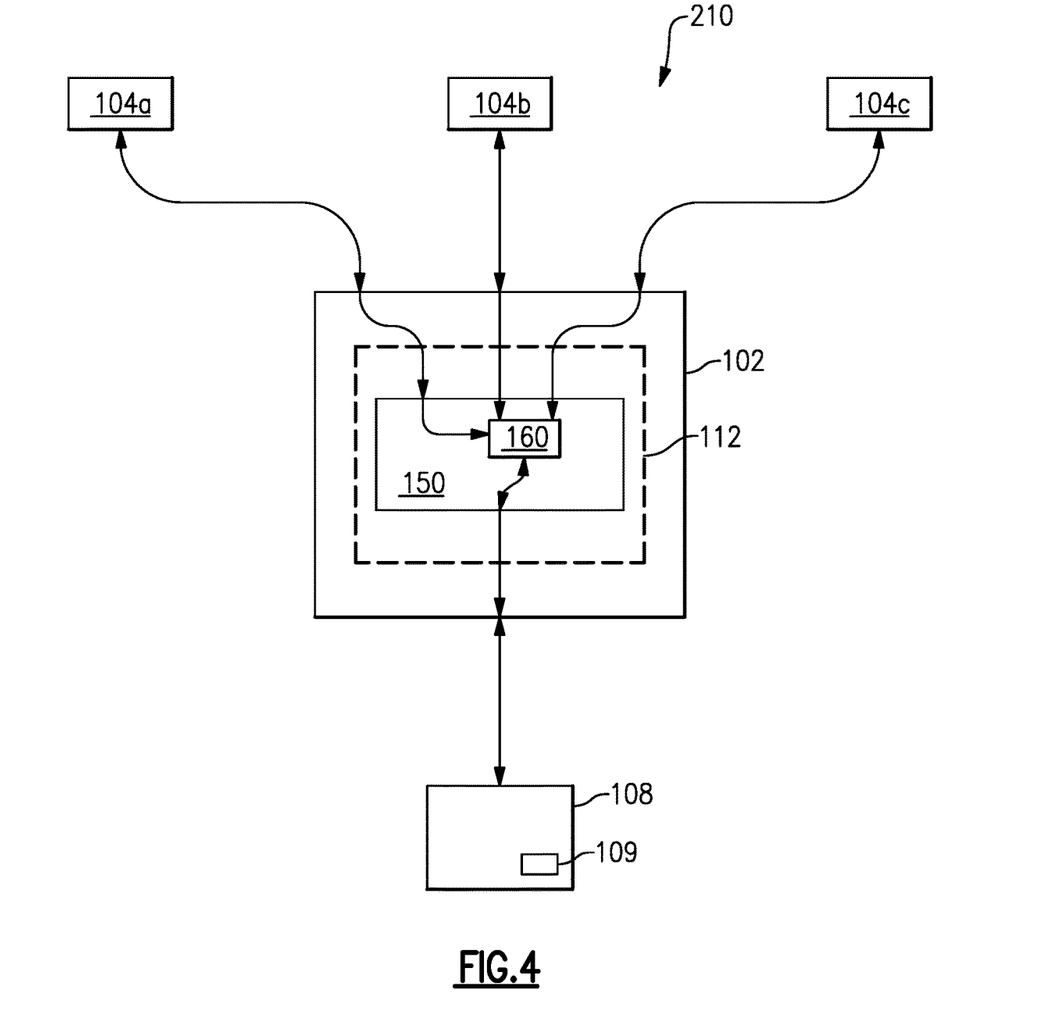
FIG. 4 illustrates a second embodiment of a system according to the system of FIG. 1.

FIG. 4 illustrates an alternate embodiment of the multi-user CAx system 100 illustrated in FIGS. 1 and 3 and described above. In the alternate embodiment of the multi-user CAx system 100, the multi-user CAx environment 112 includes a first in/first out based conflict resolution module 150 instead of the previously described locking based conflict resolution module. As with the previous example, the first in/first out based conflict resolution module 150 is contained within the multi-user CAx environment 112 in the host computer 102. The first in/first out conflict resolution module 150 is used to resolve conflicts related to undo and redo markings, or any similar edit type. As described above, without a conflict resolution module 150, undo and redo commands default to undoing the most recent edit or redoing the most recent undo, regardless of the local computer 104a, 104b, 104c originating the command. Furthermore, once a deletion or edit has been passed on to the database 109 within the data storage element 108, by the host computer 102, the corresponding data is removed or edited in the database 109, and the data no longer available for an undo or redo command.

In order to resolve the conflicts created by multiple users at the multiple local computers 104a, 104b, 104c attempting to perform simultaneous undo or redo edits, or similar type edits, the first in/first out based conflict resolution module 150 creates a temporary file 160 containing each of the undo and redo edits from all of the users 104a, 104b, 104c. In the illustrated example the temporary file 160 is contained within the first in/first out based conflict resolution module 150, which is contained within the multi-user CAx environment 112. In alternate embodiments, the temporary file 160 can be stored in a local memory of the host computer 102, in the data storage element 108, or in any similar computer memory that can be accessed by the first in/first out based conflict resolution module 150.

The temporary file 160 allows the users at each local computer 104*a*, 104*b*, 104*c* to undo and redo edits made by the users at each other local computer 104*a*, 104*b*, 104*c*, and see the results of those edits, without the edits being permanently applied to the part file in the database 109. Once all of the users at the local computers 104*a*, 104*b*, 104*c* have agreed on a given set of edits, the first in/first out based conflict resolution module 150 passes the edits on to the parts database 109, and the edits become finalized.

In the above embodiment, the edits to the temporary file 160 are performed on a first in, first out basis, with undo/redo commands from a first user at the first local computer 104*a* to make an edit being the first commands processed and applied to the temporary file 160. If another user at another local computer 104*b*, 104*c* inputs an edit that relies on a feature that was previously edited by the first user, the first in/first out based conflict resolution module 150 informs the second user that the edit can no longer be made. In some embodiments, the first in/first out based conflict resolution module 150 also informs the first user at the first local computer 104*a* that another user at another of the local computers 104*b*, 104*c* attempted to create an edit and was unable to complete the edit. In this way, the first in/first out based conflict resolution module 150 can inform the users at each of the local computers 104*a*, 104*b*, 104*c* of any potential conflicts, and allow the users to collaboratively determine a best resolution.

In yet another embodiment, the lock based and first in/first out conflict resolution modules 150 of FIGS. 3 and 4 can be combined into a single conflict resolution 150 and maintain the each of the above described functionalities in conjunction with each other. Furthermore, while the conflict resolution modules 150 are described as a software component within the multi-user CAx environment 112 of the host computer 102, it is understood that other arrangements such as a dedicated conflict resolution server acting as a gateway between the local computers 104*a*, 104*b*, 104*c* and the host computer 102 could also be implemented according to the above description.

Figure 5:
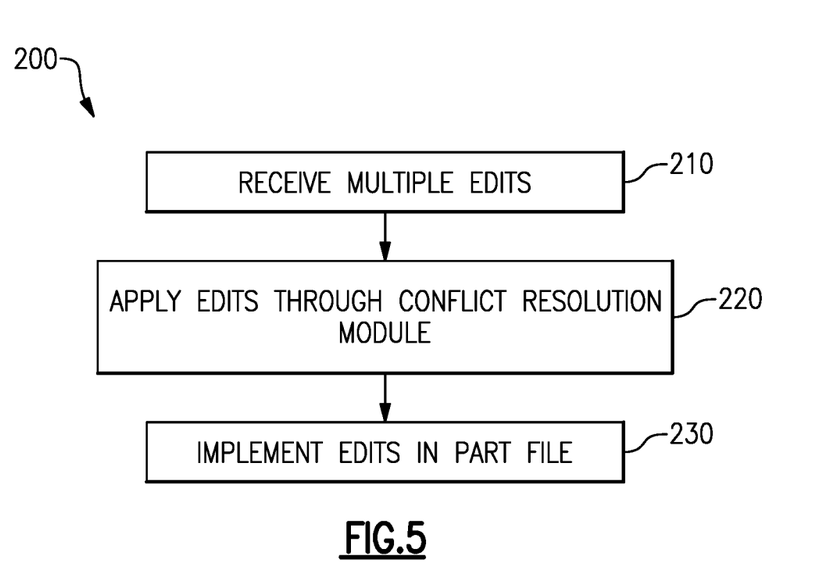
FIG. 5 illustrates a flowchart depicting a method for operating a conflict resolution module within a system for providing a multi-user CAx environment.

With continued reference to FIGS. 3 and 4, FIG. 5 depicts a method 200 for operating a conflict resolution module within a system for providing a multi-user CAx environment.

Initially, multiple edits are received at the multi-user CAx environment 112 from multiple different local computers 104*a*, 104*b*, 104*c* at block 210. In one embodiment, the received edits are non-geometric in nature.

Once received at the multi-user CAx environment 112, the edits are applied through a conflict resolution module 150 at block 220. During this process, the conflict resolution module 150 ensures that conflicting edits have not been received from different local computers 14*a*, 104*b*, 104*c*, and that the order in which edits are received from the different local computers 104*a*, 104*b*, 104*c* does not create a conflict in the implementation of the edits.

In some embodiments, the conflict resolution module 150 utilizes a lock out conflict resolution technique, as described above, where the conflict resolution module 150 in the multi-user CAx environment locks out other users beyond the first user from creating any edits to an aspect or feature of the part file being edited by the first user until after the user has completed their edits.

In other embodiments, the conflict resolution module 150 creates a temporary file and applies a first in/first out resolution scheme to received edits. In such embodiments, the edits are not implemented in the part file within the multi-user CAx environment 112 until each user operating on the part file has seen the result of the edits and approved the edits.

In yet further embodiments, the lock out and first in/first out conflict resolution techniques can be combined into a hybrid conflict resolution system incorporating the conflict resolution features of both systems.

Once the conflict resolution module 150 has ensured that no conflict is present, and has received approval from all users if necessary, the edits are implemented by the multi-user CAx environment 112 in the part file at block 230. Once the edits have been implemented in the part file, the previous version of the part file is overwritten and any further undo or redo commands are ineffective.

While described herein as separate physical computing devices, it is understood that the host computer 102 and the data storage element 108 can be separate software elements contained on a single physical computing device.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for resolving conflicting edits in a multi-user CAx environment comprising:
    receiving edits originating from a plurality of local computers at a host computer operating a multi-user CAx environment, wherein each of the local computers is operating a local CAx environment within the multi-user CAx environment;
    preventing implementation of conflicting edits using a conflict resolution module in said multi-user CAx environment by using a first in first out conflict resolution procedure wherein said first in first out conflict resolution procedure creates a temporary file in response to receiving the edits, storing the results of the edits in the temporary file, and allowing one or more users to perform one of an approve action or a modify action based on the results of the edits; and
    implementing non-conflicting edits to a part file using said multi-user CAx environment.

2. The method of claim 1, wherein the conflict resolution module is a software component within said multi-user CAx environment.

3. The method of claim 1, wherein the edit commands are non-geometric inputs.

4. The method of claim 1, further comprising a data storage component connected to said host computer wherein the data storage component includes a database storing a finished copy of a part file.

5. The method of claim 1, wherein the conflict resolution module further creates a temporary edit file and stores edits to said aspect of the part file originating from each other local computer in said temporary edit file for the duration of the first local computer's edits.

6. The method of claim 5 wherein the conflict resolution module analyzes the edits stored in the temporary edit file, removes redundant and conflicting edits in said temporary edit file and implements non-conflicting edits stored in said temporary edit file after the duration of the first local computer's edits.

\* \* \* \* \*